United States Patent [19]

Graham

[11] Patent Number: 5,073,454
[45] Date of Patent: Dec. 17, 1991

[54] OXIDATION RESISTANT ACTIVATED CARBON AND METHOD OF PREPARATION

[75] Inventor: James R. Graham, Fountain Valley, Calif.

[73] Assignee: Westates Carbon, Los Angeles, Calif.

[21] Appl. No.: 403,234

[22] Filed: Sep. 5, 1989

[51] Int. Cl.$^5$ .......................... B32B 9/04; B01J 20/30
[52] U.S. Cl. .............................. 428/403; 252/378 R;
427/154; 427/215; 427/397.8; 428/404;
428/408; 502/56; 502/514
[58] Field of Search ...................... 427/215, 154, 397.7,
427/397.8; 252/378 R; 502/56, 180, 423, 424,
427, 514; 210/504, 500.25, 502.1, 694; 428/403,
404, 408

[56] References Cited

U.S. PATENT DOCUMENTS

| | | | |
|---|---|---|---|
| 3,658,724 | 4/1972 | Stiles | 502/180 |
| 4,119,189 | 10/1978 | Ehrenreich | 427/228 |
| 4,218,502 | 8/1980 | Graham et al. | 428/144 |
| 4,234,639 | 11/1980 | Graham | 428/144 |
| 4,372,997 | 2/1983 | Fritze et al. | 428/144 |
| 4,465,777 | 8/1984 | Shuford | 427/419.7 |
| 4,521,333 | 6/1985 | Graham et al. | 252/606 |
| 4,559,270 | 12/1985 | Sara | 427/376.2 |
| 4,567,103 | 1/1986 | Sara | 427/376.2 |
| 4,582,751 | 4/1986 | Vasilos et al. | 427/255.1 |
| 4,776,355 | 10/1988 | Stevenson et al. | 131/352 |
| 4,837,073 | 6/1989 | McAllister et al. | 427/380 |

FOREIGN PATENT DOCUMENTS

| | | | |
|---|---|---|---|
| 56-129605 | 10/1981 | Japan | 502/56 |
| 60-106532 | 6/1985 | Japan | 502/56 |
| 1350111 | 11/1987 | U.S.S.R. | 502/423 |

OTHER PUBLICATIONS

Interam TM, Fire Protection Products, 2 pages, No. 98-0400-1025-2(39.2) R1 XY, 3M Ceramic Materials Department.

*Primary Examiner*—Shrive Beck
*Assistant Examiner*—Terry J. Owens
*Attorney, Agent, or Firm*—F. Eugene Logan

[57] ABSTRACT

An activated carbon coated with an intumescent material which will expand at an elevated temperature and render the activated carbon resistant to oxidation. The activation carbon can be in granulated form, including pelletized, and impregnated. The intumescent material is preferably attached to about 10% of the exterior surface of the activated carbon and when exposed to a certain elevated temperature the intumescent material will expand and cover all or almost all of the exterior surface of the activated carbon thereby preventing its burning. The amount of intumescent material is not operable for causing a detrimental reduction in the adsorption capacity of the activated carbon when the coated activated carbon is at temperatures below the certain designed elevated temperature.

48 Claims, 5 Drawing Sheets

OXIDATION RESISTANT ACTIVATED CARBON AND METHOD OF PREPARATION

BACKGROUND OF THE INVENTION

The use of intumescent material to act as a fire retardant for roofing materials such as asphalt sheeting, shingles and roofing granules are known and disclosed in U.S. Pat. Nos. 4,218,502; 4,234,639; 4,372,997 and 4,521,333. Use of intumescent material for imparting self-extinguishing properties to cigarettes is disclosed in U.S. Pat. No. 4,776,355. The above mention patents are hereby incorporated herein by reference for their disclosure of intumescent materials and method of production.

SUMMARY OF THE INVENTION

Activated carbon has long been used as an adsorbent in the chemical, food processing, air cleaning and water purification industries. Because activated carbon is a combustible solid, when used in air purification applications, there always exist the possibility of inadvertent burning of the activated carbon anytime during its storage, handling, use, recovery and reactivation.

It has heretofore largely been believed by those experienced in the art that it was not possible to lower the oxidation resistance of activated carbon without simultaneously detrimentally reducing its adsorption capacity. Since adsorbents are principally dependent on a high surface area and porosity that is formed during activation, any changes to the adsorbent surface which would limit access to the high surface area and porosity would detrimentally effect its adsorption capacity. Thus the inadvertent burning of activated carbon beds has been accepted as a necessary risk in the chemical and contaminant abatement industries. To minimize the damage of such inadvertent burning of activated carbon sprinkler systems, smoke alarms, standby fire treating equipment and other means have been relied upon.

Although such fire extinguishing equipment is quite valuable what is needed in the industry is an activated carbon which is resistant to oxidation thereby greatly reducing the possibility of bodily harm and damage to property.

Therefore it is an object of this invention to provide an activated carbon which is resistant to oxidation.

It is another object of this invention to provide an activated carbon which is coated with an intumescent material which will expand at a predetermine elevated temperature and render the activated carbon resistant to oxidation.

It is still another object of this invention to provide an activated carbon which will prevent hot spots from forming and propagating throughout the activated carbon bed.

It is yet another object of this invention to provide an activated carbon which will prevent activated carbon beds from burning.

It is a still further object of this invention to provide an activated carbon which is resistant to oxidation without a detrimental reduction in the adsorption capacity of the activated carbon.

It is also an object of this invention to provide methods of treating activated carbon so that it will meet the aforementioned objectives.

It is yet another object of this invention to provide such an intumescent material coating to all forms of activated carbon including granular, impregnated granular and pelletized forms of activated carbon.

It is another object of this invention to provide an activated sorbent which is resistant to exothermic reaction.

It is further object of this invention to provide an activated sorbent which is coated with an intumescent material which will expand at a predetermine elevated temperature and render the activated sorbent resistant to exothermic reaction.

It is a still further object of this invention to provide an activated sorbent which is resistant to exothermic reaction without a detrimental reduction in the sorption capacity of the activated sorbent.

Accordingly, there is provided by the principals of this invention a composition of matter comprising an activated sorbent having an effective portion of the surface thereof attached to, or coated with, an intumescent material operable for increasing the exothermic reaction resistance of the activated sorbent when subjected to a predetermined elevated temperature.

There is also provided by the principals of this invention a composition of matter comprising activated carbon having an effective portion of the surface thereof attached to, or coated with, an intumescent material operable for increasing the oxidation resistance of the activated carbon when subjected to a predetermined elevated temperature.

There is also provided by the principals of this invention a composition of matter comprising an adsorbent which comprises activated carbon; and an effective amount of an intumescent material attached to the exterior surface of the adsorbent, the intumescent material being operable for increasing the oxidation resistance of the adsorbent when subjected to a predetermined elevated temperature.

In one embodiment the activated carbon is granular activated carbon. In one embodiment the granular activated carbon is impregnated and in another embodiment it is pelletized. In a further embodiment the granular activated carbon has an average width of from about 0.5 mm to about 5 mm and an average length-to-width ratio of from about 1 to about 4.

In one embodiment of this invention the intumescent material is an inorganic material, in another embodiment the intumescent material is selected from the group consisting of metallic silicates, metallic borates and mixtures thereof, and in yet another embodiment of this invention the intumescent material is selected from the group consisting of sodium silicates, zinc borates and mixtures thereof. In a preferred embodiment the intumescent material is a mixture of sodium silicate and zinc metaborate.

In one embodiment of this invention the particle size of the intumescent material attached to the exterior surface of the activated carbon is relatively small compared to the exterior surface of the activated carbon. In another embodiment the average particle size of the intumescent material is from about 1 micron to about 2000 microns. In yet another embodiment the average particle size of the intumescent material is from about 10 microns to about 1000 microns. In still another embodiment the average particle size of the intumescent material is from about 20 microns to about 500 microns. Other intumescent material particles sizes can be used. In general the particle size, amount and chemical composition of the intumescent material is selected to provide for the desired amount of intumescence or expansion.

In one embodiment of this invention the intumescent material will expand at least about 5 times its original volume when subjected to the predetermined elevated temperature, in another embodiment the intumescent material will expand at least about 10 times its original volume, and in still another embodiment the intumescent material will expand at least about 15 times its original volume.

In one embodiment of this invention the effective amount of intumescent material is not operable for causing a detrimental reduction in the adsorption capacity of the activated carbon when the coated activated carbon is at temperatures below the predetermined elevated temperature.

In one embodiment of this invention the predetermined elevated temperature is at least about 180° C. In another embodiment the predetermined elevated temperature is at least about 230° C., and in still another embodiment the predetermined elevated temperature is at least about 250° C. In yet another embodiment the predetermined elevated temperature is from about 230° C. to about 300° C., and preferably about 260° C.

In one embodiment of this invention the effective portion of the exterior surface of the activated carbon is large enough that, when the coated activated carbon is subjected to a predetermined elevated temperature, the intumescent material will expand and cover additional area of the exterior surface of the coated activated carbon which is operable for increasing the oxidation resistance of the coated activated carbon.

In one embodiment of this invention the effective unexpanded coated portion of the surface is from about 1% or about 3% to about 25% of the total surface of the activated carbon. In another embodiment the effective coated portion of the surface is from about 5% to about 15% of the total surface of the activated carbon. In yet another embodiment the effective coated portion of the surface is about 10% of the total surface of the activated carbon.

In one embodiment of this invention the effective amount of intumescent material is operable for causing the intumescent material of the coated activated carbon when subjected to the predetermined elevated temperature to expand and cover at least about 70% of the surface of the coated activated carbon, in another embodiment it will cover at least about 90% of the surface of the coated activated carbon, and in a yet another embodiment it will cover at least about 98% of the surface of the coated activated carbon.

In one another embodiment of this invention the amount of intumescent material is from about 2% to about 20% of the weight of the activated carbon. In another embodiment the amount of intumescent material is from about 5% to about 15% of the weight of the activated carbon. In still another embodiment of this invention the amount of intumescent material is about 10% of the weight of the activated carbon.

It has been found that all of the above intumescent material coating descriptions can be applied to activated sorbents and activated carbons.

Accordingly, there is provided by the principals of this invention a process for increasing the exothermic reaction resistance of an activated sorbent comprising attaching to, or applying (as a coating) to, a portion of the surface of an activated sorbent, an effective amount of an intumescent material thereby forming coated activated sorbent, the effective amount of intumescent material being operable for increasing the exothermic reaction resistance of the activated sorbent when the activated sorbent is subjected to a predetermined elevated temperature.

There is also provided by the principals of this invention a process for increasing the oxidation resistance of activated carbon comprising attaching to, or applying (as a coating) to, a portion of the surface of activated carbon with an effective amount of an intumescent material thereby forming coated activated carbon, the effective amount of intumescent material being operable for increasing the oxidation resistance of the activated carbon when the activated carbon is subjected to a predetermined elevated temperature.

In one embodiment of this invention the coating of a portion of the surface of activated carbon with an intumescent material includes contacting the activated carbon with intumescent material and water thereby forming a mixture; and removing water from the mixture thereby forming the intumescent material coated activated carbon. In one embodiment the contacting is performed in a water solution. In another embodiment the contacting is performed by spraying a water solution containing the intumescent material onto the activated carbon.

There is also provided by the principals of this invention a process for reactivating spent, intumescent material coated, granular carbon and increasing the oxidation resistance thereof comprising:

heating spent, intumescent material coated granular carbon, which has become spent by an adsorbed contaminant, to a predetermined high temperature operable for removing the adsorbed contaminant therefrom and expanding the intumescent material thereby reforming granular activated carbon;

removing and separating the intumescent material from the reformed granular activated carbon thereby producing separated reformed activated granular carbon; and coating an effective portion of the surface of the reformed granular activated carbon with an effective amount of intumescent material thereby forming recoated granular activated carbon, the effective portion of the surface of the recoated granular activated carbon being operable for increasing the oxidation resistance thereof when subjected to a predetermined elevated temperature, and the effective portion of the surface of the recoated granular activated carbon not being operable for detrimentally decreasing the adsorption capacity thereof when the recoated granular activated carbon is at temperatures below the predetermined elevated temperature.

In one embodiment of this invention the removing and separating the intumescent material comprises the step of screening the spent coated granular carbon under conditions operable for dislodging the intumescent material from the surface of the spent coated granular carbon.

DESCRIPTION OF THE PREFERRED EMBODIMENTS

Activated carbon is available in commercial quantities in the form of a fine powder or as larger particles such as granules and pellets. Granular and pelletized activated carbon are preferred in many applications because of their ease in handling, storage, and recovery and their lower resistance to the flow of gas than fine powder.

Granular and pelletized activated carbons, are available in a wide variety of sizes and shapes, the preferred size and shape being dependent on the particular application for the activated carbon. One shape that is often preferred for treating gas streams are cylindrical pellets with an average width or diameter of from about 1.5 mm to about 5 mm and an average length-to-diameter ratio of from about 1 to about 4. Unless otherwise specified the term "granular activated carbon" as used herein is meant to include granular and pelletized forms of activated carbon.

Figure 1:
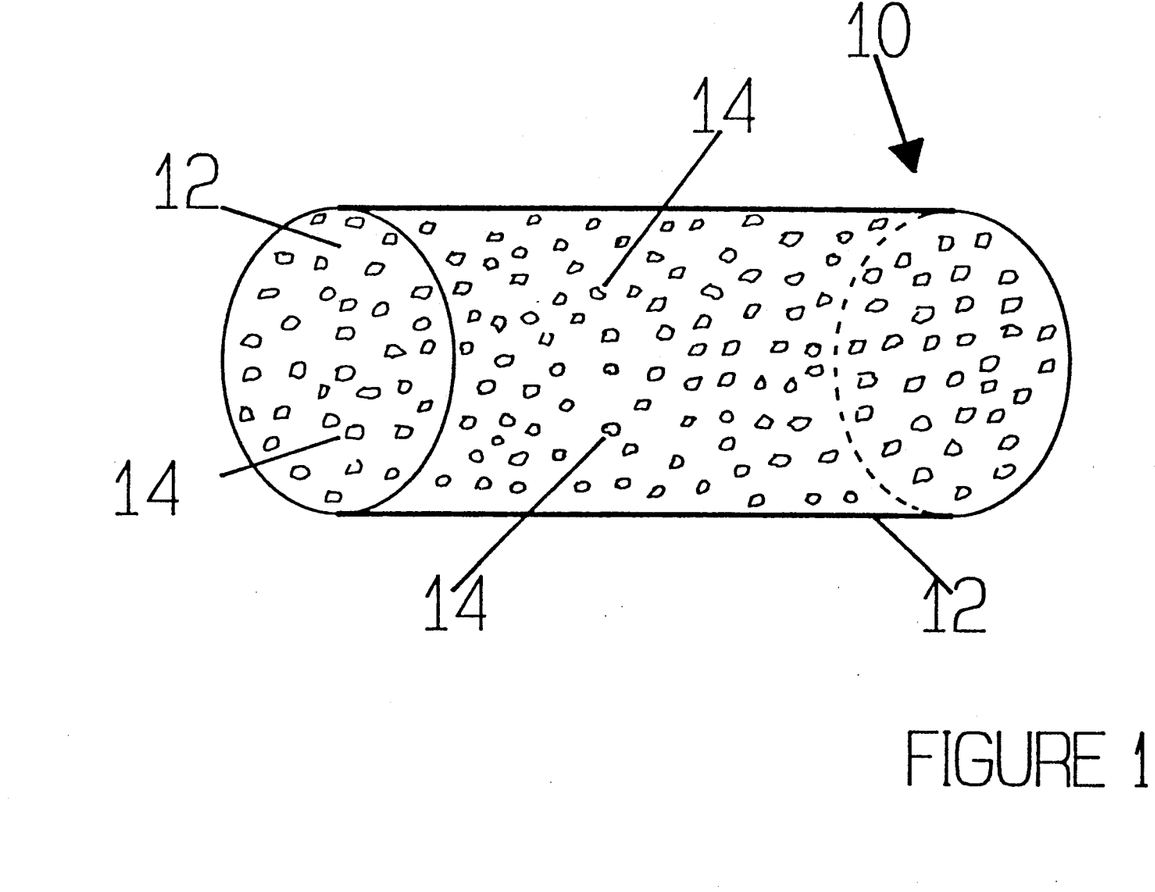
FIG. 1 is an intumescent material coated activated carbon granule.

FIG. 1 represents a single activated carbon granule 10 having an exterior surface 12 with small distinct bodies of intumescent material 14 attached to the exterior surface 12 of the activated carbon granule. In this preferred embodiment the intumescent material occupies about 10% of the total exterior surface of the activated carbon granule. Other amounts of intumescent material can be used if desired and intumescent material amounts of from as little as about 1% to about 30% will be operational with the preferred amount being from about 5% to about 15%.

The intumescent material selected in this embodiment is designed to expand at least about ten fold when the granule is subjected to a predetermined elevated temperature of about 260° C. Upon expansion of the intumescent material an expanded intumescent coat 16 is formed which covers a large portion, or all, of the exterior surface of the activated carbon granule as depicted in FIG. 2.

Since large quantities of granular activated carbon are used in activated carbon beds, modules and filters (hereinafter referred to collectively as "beds"), it is not necessary that each granule be completely encased in the expanded intumescent material since the intumescent material attached to one granule in a bed of granules will expand and cover a portion of the exterior surface of an adjacent granule.

Figure 2:
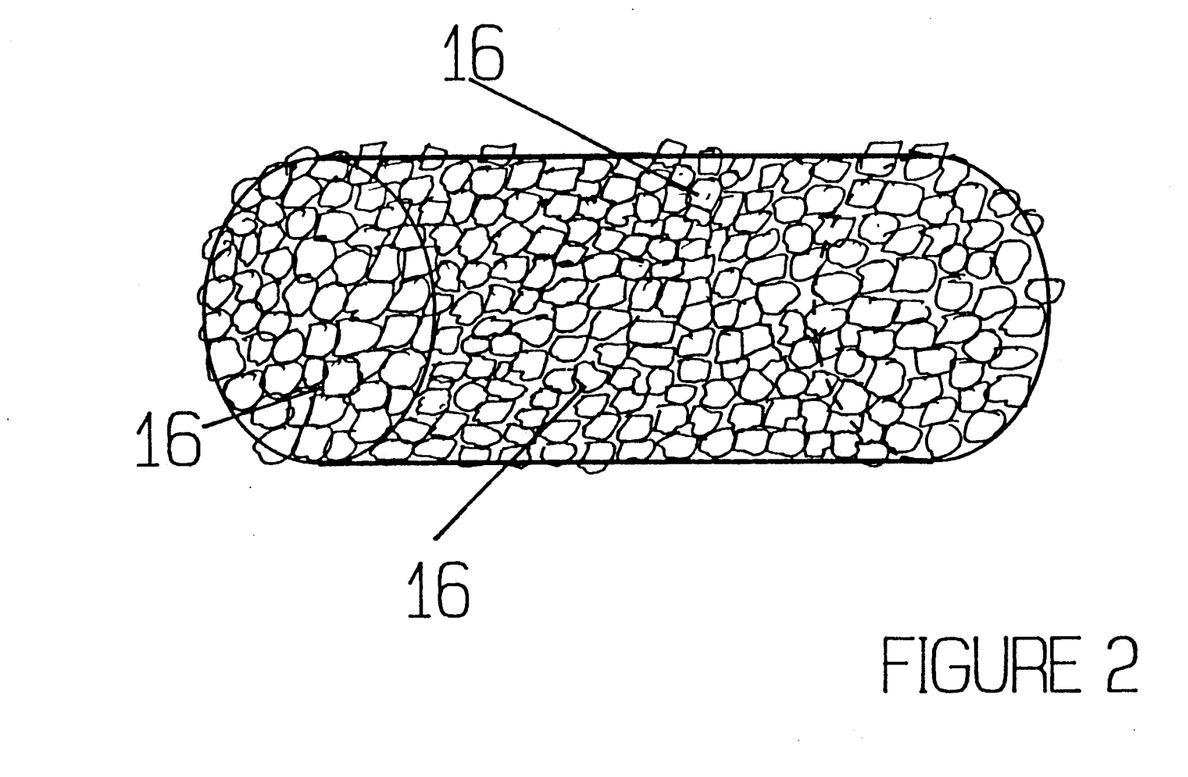
FIG. 2 is the activated carbon granule of FIG. 1 in which the intumescent material coating has been expanded.

As can be seen from FIG. 2, the intumescent material forms a barrier covering the activated carbon granule, and, as a consequence, the intumescent material is operable for increasing the oxidation resistance of the activated carbon bed. Therefore if any portion of the bed should develop a hot spot, the intumescent material will effectively seal off the hot spot from the remainder of the bed and prevent ignition or burning of the bed. Ignition or burning of the entire bed is therefore essentially eliminated with the use of intumescent material coated granular activated carbon.

Figure 3:
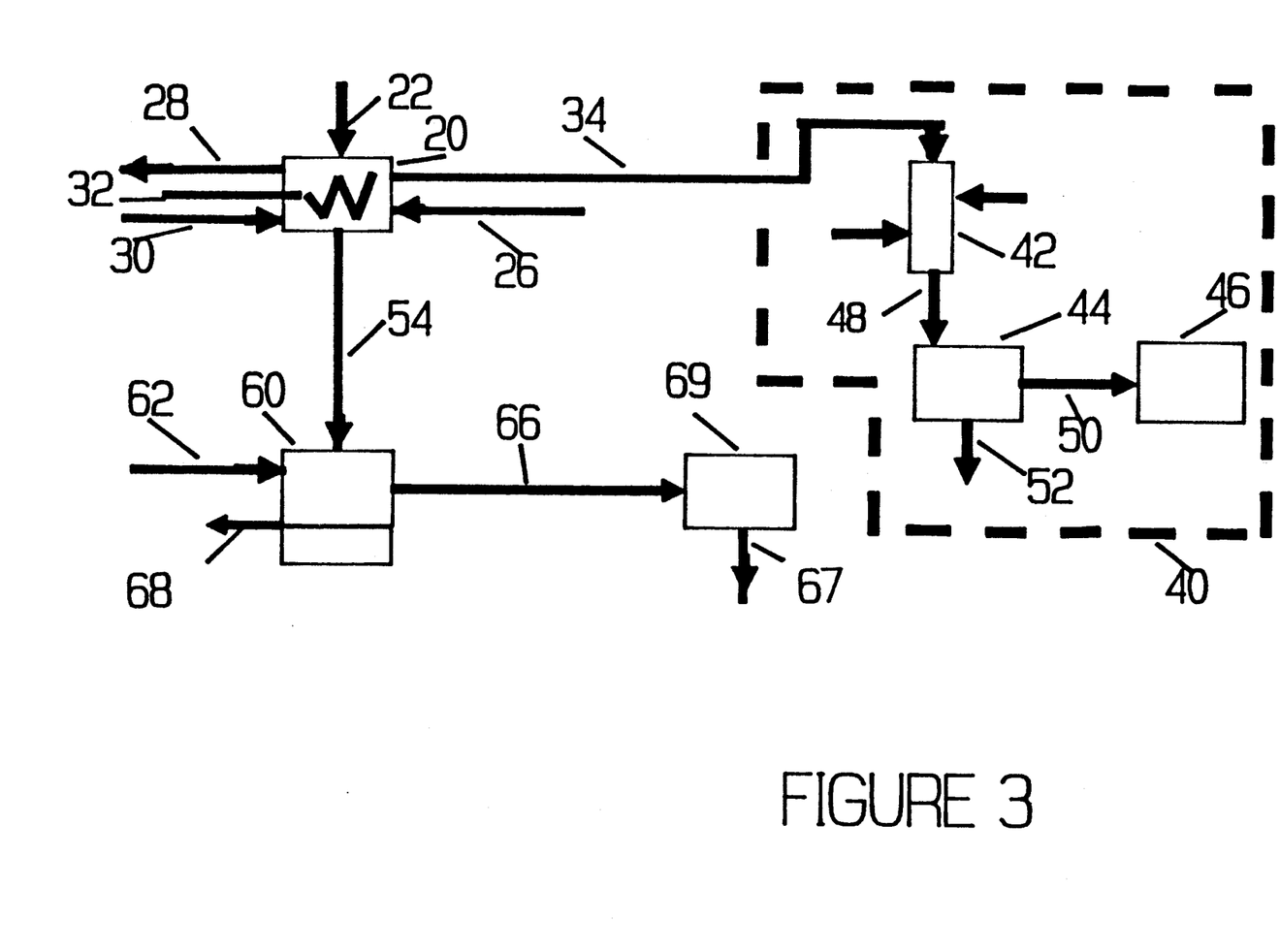
FIG. 3 is a flow diagram of a conventional system for use and reactivation of uncoated activated carbon.

One conventional usage of (uncoated) activated carbon is shown in the flow diagram of FIG. 3. Granular activated carbon is charged to container 20 through conduit 22 to form bed 24 of granular activated carbon. Contaminated air containing volatile organic vapors is introduced into bed 24 through conduit 26. The volatile organic vapors and other contaminants are adsorbed by the granular activated carbon in bed 24 and a clean air stream is discharged through conduit 28.

When activated carbon bed 24 is saturated it must be reactivated. One method to reactivate the carbon is to remove it from the bed and subject the spent carbon granules to a conventional reactivation process. Another way to reactivate the carbon is shown in FIG. 3 wherein the bed is taken out of service and the bed is reactivated in situ by steam introduced through conduit 30. Bed 24 can also be heated by external heating means as for example by electrical heater 32.

The steam strips off the contaminants adsorbed on the granular activated carbon and the contaminants and steam are removed through conduit 34 and introduced into contaminant recovery system 40. During steam stripping bed 24 is preferably maintained at a temperature of about 177° C.

A conventional recovery system can comprise condenser or heat exchanger 42, phase separator 44 and storage vessel 46. The volatile vapors and steam are condensed in exchanger 42. The condensate removed through conduit 48 and introduced into phase separator 44. The condensed organic contaminant is removed from the separator through conduit 50 and stored in vessel 46. The water from the condensed steam can be removed through conduit 52 and used for producing additional steam.

Bed 24 can be reactivated numerous times in this manner, however, eventually more sever reactivation means will be necessary to remove those contaminants which are not removed by steam stripping at 177° C. This is accomplished by removing the spent carbon granules from container 20 through conduit 54 and charging the spent carbon to high temperature reactor 60. The spent carbon granules are heated in reactor 60 in the presence of steam introduced through conduit 62 and heater 64 to a temperature from about 760° C. to about 870° C. The heavy organic contaminants are stripped off at this very high temperature and the carbon granules become reactivated. The reactivated carbon granules are removed through conduit 68 and used for recharging to bed 20. The stripped contaminants are normally partially oxidized in the reactor. The vent gases from the reactor are removed through conduit 66 and sent to a high temperature afterburner 69 where the organic vapors are completely converted to non-toxic gases and vented to the atmosphere through conduit 67.

The intumescent material coated granular activated carbon of this invention can be used in the same manner as conventional granular activated carbon is used. However, the use of a high temperature reactivation process requires the addition of several steps as depicted in the flow diagram of FIG. 4. Identical elements which appear in several of the figures have the same element number.

Figure 4:
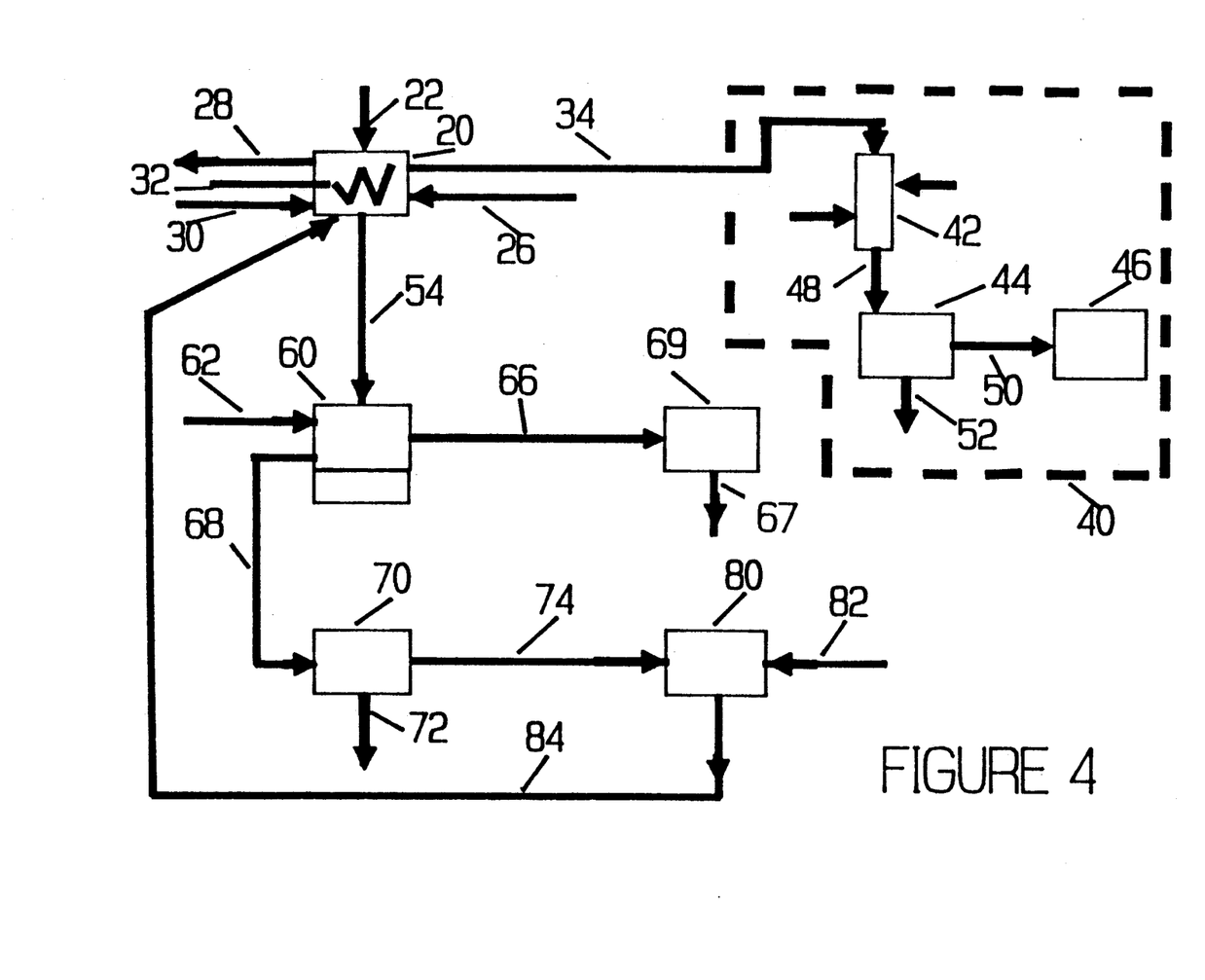
FIG. 4 is a flow diagram of a system for the use and reactivation of intumescent material coated activated carbon.

In particular the reactivation of carbon granules produced in reactor 60 at much higher temperature cause the intumescent material to expand on the carbon granules. The carbon granules with the expanded intumescent material are then introduced into vibrating screen 70 wherein the expanded intumescent material is dislodged from the surface of the reactivated carbon granules and is separated as a fine fraction which is removed through conduit 72 and sent to disposal. A course fraction which contains the reactivated carbon granules is removed through conduit 74. The reactivated carbon granules are recoated with intumescent material in coating system means 80. Conduit 82 represents means for introducing the intumescent material into system 80. Intumescent material coated granular activated carbon is removed from system 80 through outlet 84 and introduced into container 20.

The details of coating system means 80 have not been specified in FIG. 4 because a number of methods can be used to attach the intumescent material to the granular activated carbon. Some of these methods will be described in the following experimental examples, which are means for attaching to, or applying (as a coating) to, an activated sorbent or activated carbon an intumescent material. However, other methods of attaching the coating will be apparent to those skilled in the art.

EXPERIMENTAL EXAMPLE NO. 1

In this experiment a material sold by 3M under the trademark "EXPANTROL" was used as the intumescent material coating agent for the granular activated carbon. EXPANTROL brand intumescent material is an alkali metal silicate containing material which is referred to in 3M publications as "EXPANTROL Granules".

In a laboratory experiment, to a beaker was added about 10 gr of a 3.5 mm diameter pelletized activated carbon and about 1 gr of EXPANTROL intumescent powder contained in a water solution of ELMER'S brand white glue. The white glue was used as a bonding agent to attach the intumescent particles to the surface of the activated carbon pellets. The activated carbon pellets were well mixed with the water/glue solution to insure that the intumescent material was well dispersed on the exterior surface of the activated carbon pellets.

The coated activated carbon pellets were poured on to a paper towel and spread out so that they were physically separated, and then allowed to air dry. After air drying the intumescent material coated activated carbon pellets were dried in an oven at 130° C. for 30 minutes. The surface of the dried product was observed to be covered with uneven white patches of EXPANTROL intumescent material. It was estimated that the intumescent material was attached to about 10% of the exterior surface of the activated carbon pellets.

The thusly produced intumescent material coated granular activated carbon was placed into a high temperature furnace at 760° C. for about 5 minutes at three spaced apart intervals. The result was that the intumescent material expanded and completely covered the exterior surface of the granular activated carbon, furthermore, and most importantly, no significant burning of the granular activated carbon was observed. Uncoated granular activated carbon placed in the furnace with the intumescent material coated carbon was observed to burn. It was therefore concluded that the intumescent material coating increased the oxidation resistance of the granular activated carbon to the extent that it was fire resistant under the above described conditions.

EXPERIMENTAL EXAMPLE NO. 2

In this example the intumescent material is applied as a solution that covers the surface of the carbon particles with a thin coating that upon drying forms a microporous film.

Figure 5:
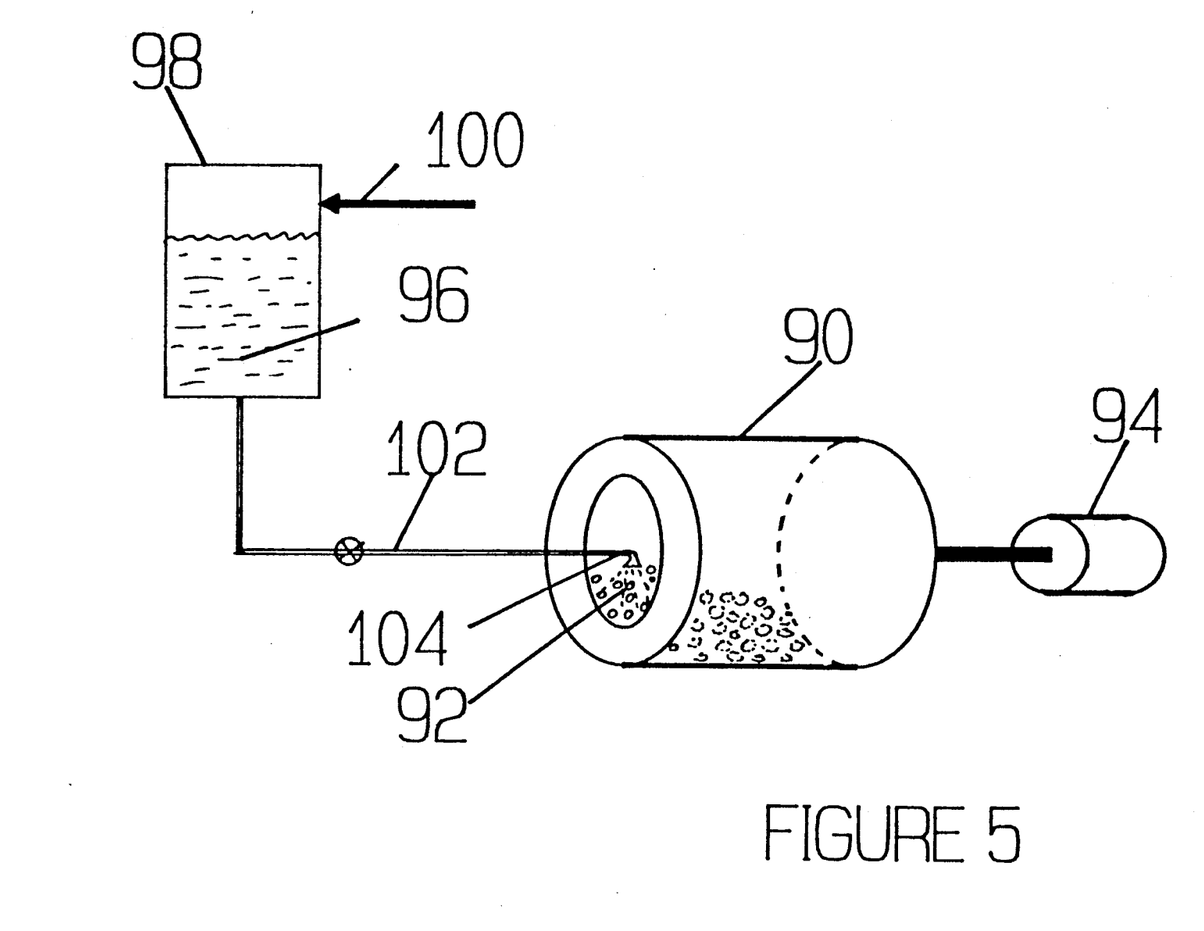
FIG. 5 is a schematic of a method for producing intumescent material coated activated carbon.

Refering to FIG. 5, in a five gallon coating pan 90, was placed 1000 gr of 3.5 mm diameter granular activated carbon 92. Motor 94 which rotates pan 90 was turned on and the coating pan rotated at about 30 RPM. While the granular activated carbon 92 was being tumbled in the coating pan an intumescent material-forming aqueous mixture 96 contained in feed vessel 98 was fed under pressure from line 100 and applied by means of a course spray nozzle 104 to the tumbling granular activated carbon 92 in pan 90. The intumescent material forming aqueous mixture or spray mixture 96 contained:

i. sodium silicate solution that was 35% by weight solids with a $SiO_2/Na_2O$ weight ratio of 3.2, and ii. zinc metaborate powder ($3ZnO.2B_2O_3$).

Spray mixture 96 was prepared by taking 215 gr of the sodium silicate solution and adding 25 gr of zinc metaborate and quickly mixing to dissolve the zinc metaborate. Then without delay the sodium silicate/zinc metaborate solution was quickly sprayed onto the rotating granular activated carbon in coating pan 90.

The solution completely covered the exterior surface of the granular activated carbon and quickly solidified on its exterior surface. Rotation of the coating pan was continued for about 10 additional minutes or until the particles showed no tendency to stick together.

The coated granular activated carbon was then removed from the coating pan and placed in a drying oven maintained at 110° C. for 4 hours. The dried intumescent material coated granular activated carbon was found to have a shiny microporous coating that comprised about 10% of the weight of the granular activated carbon. The coated granular activated carbon was found to be substantially less dusty than uncoated granular activated carbon.

The coated granular activated carbon was compared to uncoated granular activated carbon by placing in a 760° C. oven for three spaced apart intervals of time of 5 minutes duration each. The uncoated granular activated carbon was observed to burn, however, little or no burning was observed to have occurred with the intumescent material coated granular activated carbon. Upon microscopic examination the coating on the intumescent material coated granular activated carbon was found to have expanded approximately 10 to 15 times its original thickness after being subjected to 760° C. as described above.

The adsorption capacity of the coated and uncoated granular activated carbon was measured using a standard published method, namely ASTM-03467-76 method. This particular ASTM method measures the carbon tetrachloride activity or micropore volume of the granular activated carbon. A value of 60-62 weight % was measured for the uncoated granular activated carbon which compares to a measured value of 56-58 weight % for the intumescent material coated granular activated carbon. When these results are expressed on an activated carbon weight basis no loss in carbon tetrachloride activity was observed. These measured results demonstrate that a coating of intumescent material does not result in a detrimental decrease the adsorption capacity of the granular activated carbon substrate.

Therefore what is meant by the term "a nondetrimental reduction in sorption capacity" as used herein is meant a sorption capacity measurement based on carbon weight (not total weight) of 5% of less, and what is meant by the term "a nondetrimental reduction in adsorption capacity" as used herein is meant a adsorption capacity measurement based on carbon weight (not total weight) of 5% or less.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A process for increasing the oxidation resistance of activated carbon comprising:
    coating a portion of the surface of activated carbon with an effective amount of an intumescent material thereby forming coated activated carbon with a portion of the surface of the activated carbon not being coated with the intumescent material,
    the effective amount of intumescent material being operable for increasing the oxidation resistance of the activated carbon when the activated carbon is subjected to a predetermined elevated temperature.

2. The process of claim 1, wherein the effective amount of intumescent material is not operable for causing a detrimental reduction in the adsorption capacity of the activated carbon when the coated activated carbon is at temperatures below the predetermined elevated temperature.

3. The process of claim 1, wherein the effective amount of intumescent material is operable for coating between about 1% and about 25% of the surface of the activated carbon.

4. The process of claim 1, wherein the effective amount of intumescent material is operable for coating between about 5% and about 15% of the surface of the activated carbon.

5. The process of claim 1, wherein the effective amount of intumescent material is operable for coating about 10% of the surface of the activated carbon.

6. The process of claim 1, wherein the intumescent material is an inorganic material.

7. The process of claim 1, wherein the intumescent material is selected from the group consisting of metallic silicates, metallic borates and mixtures thereof.

8. The process of claim 1, wherein the intumescent material is selected from the group consisting of sodium silicates, zinc borates and mixtures thereof.

9. The process of claim 1, wherein the intumescent material will expand at least about 5 times its original volume when subjected to the predetermined elevated temperature.

10. The process of claim 1, wherein the intumescent material will expand at least about 10 times its original volume when subjected to the predetermined elevated temperature.

11. The process of claim 1, wherein the intumescent material will expand at least about 15 times its original volume when subjected to the predetermined elevated temperature.

12. The process of claim 1, wherein the effective amount of intumescent material is operable for causing the intumescent material of the coated activated carbon when subjected to the predetermined elevated temperature to expand and cover at least about 70% of the surface of the coated activated carbon.

13. The process of claim 1, wherein the effective amount of intumescent material is operable for causing the intumescent material of the coated activated carbon when subjected to the predetermined elevated temperature to expand and cover at least about 90% of the surface of the coated activated carbon.

14. The process of claim 1, wherein the effective amount of intumescent material is operable for causing the intumescent material of the coated activated carbon when subjected to the predetermined elevated temperature to expand and cover at least about 98% of the surface of the coated activated carbon.

15. The process of claim 1, wherein the predetermined elevated temperature is at least about 180° C.

16. The process of claim 1, wherein the predetermined elevated temperature is at least about 230° C.

17. The process of claim 1, wherein the predetermined elevated temperature is at least about 250° C.

18. The process of claim 1, wherein the predetermined elevated temperature is from about 230° C. to about 300° C.

19. The process of claim 1, wherein the predetermined elevated temperature is about 260° C.

20. The process of claim 1, wherein said coating of a portion of the surface of activated carbon with an intumescent material includes:
    contacting the activated carbon with intumescent material and water thereby forming a mixture; and
    removing water from the mixture thereby forming the intumescent material coated activated carbon.

21. The process of claim 1, wherein the contacting is performed in a water solution.

22. The process of claim 1, wherein the contacting is performed by spraying a water solution containing the intumescent material onto the activated carbon.

23. A process for increasing the oxidation resistance of activated carbon comprising:
    coating a portion of the surface of activated carbon with an effective amount of an intumescent material thereby forming coated activated carbon with a portion of the surface of the activated carbon not being coated with the intumescent material,
    the effective amount of intumescent material being operable for increasing the oxidation resistance of the activated carbon when the activated carbon is subjected to a predetermined elevated temperature, and
    wherein the intumescent material is a mixture of sodium silicate and zinc metaborate.

24. A process for increasing the oxidation resistance of granular activated carbon comprising:
    coating an effective portion of the surface of granular activated carbon with an intumescent material thereby forming coated granular activated carbon with a portion of the surface of the granular activated carbon not being coated with the intumescent material,
    the effective portion of the surface of the granular activated carbon being sufficient for increasing the oxidation resistance of the granular activated carbon when it is subjected to a predetermined elevated temperature, and the effective portion of the surface of the granular activated carbon being insufficient for causing a detrimental reduction in the adsorption capacity of the granular activated carbon when the coated granular activated carbon is at temperatures below the predetermined elevated temperature.

25. The process of claim 24, wherein the granular activated carbon has an average width of from about 0.5 mm to about 5 mm and an average length-to-width ratio of from about 1 to about 4.

26. A process for increasing the oxidation resistance of granular activated carbon comprising:

coating an effective portion of the surface of granular activated carbon with an intumescent material thereby forming coated granular activated carbon, the effective portion of the surface of the granular activated carbon being sufficient for increasing the oxidation resistance of the granular activated carbon when it is subjected to a predetermined elevated temperature, and the effective portion of the surface of the granular activated carbon being insufficient for causing a detrimental reduction in the adsorption capacity of the granular activated carbon when the coated granular activated carbon is at temperatures below the predetermined elevated temperature, heating the thus-coated granular carbon, which has become spent by an adsorbed contaminant, to a predetermined high temperature operable for removing the adsorbed contaminant therefrom and expanding the intumescent material thereby reforming granular activated carbon;

removing and separating the intumescent material from the reformed granular activated carbon thereby producing separated reformed activated granular carbon; and coating an effective portion of the surface of the separated reformed granular activated carbon with an effective amount of intumescent material thereby forming recoated granular activated carbon, the effective portion of the surface of the recoated granular activated carbon being sufficient for increasing the oxidation resistance thereof when subjected to the predetermined elevated temperature, and the effective portion of the surface of the recoated granular activated carbon being insufficient for causing a detrimental reduction in the adsorption capacity of the granular activated carbon when the granular activated carbon is at a temperature below the predetermined elevated temperature.

27. The process of claim 26, wherein the removing and separating the intumescent material comprises the step of screening the spent coated granular carbon under conditions operable for dislodging the intumescent material from the surface of the spent coated granular carbon.

28. A process for reactivating spent, intumescent material coated, granular carbon and increasing the oxidation resistance thereof comprising:

heating spent, intumescent material coated granular carbon, which has become spent by an adsorbed contaminant, to a predetermined high temperature operable for removing the adsorbed contaminant therefrom and expanding the intumescent material thereby reforming granular activated carbon;

removing and separating the intumescent material from the reformed granular activated carbon thereby producing separated reformed activated granular carbon; and coating an effective portion of the surface of the reformed granular activated carbon with an effective amount of intumescent material thereby forming recoated granular activated carbon, the effective portion of the surface of the recoated granular activated carbon being sufficient for increasing the oxidation resistance thereof when subjected to a predetermined elevated temperature, and the effective portion of the surface of the recoated granular activated carbon being insufficient for detrimentally decreasing the adsorption capacity thereof when the recoated granular activated carbon is at temperatures below the predetermined elevated temperature.

29. A composition of matter comprising:

activated carbon having an effective portion of the surface thereof coated with an intumescent material, with a portion of the surface of the activated carbon not being coated with the intumescent material, the intumescent material being operable for increasing the oxidation resistance of the activated carbon when subjected to a predetermined elevated temperature.

30. The composition of matter of claim 29, wherein the effective coated portion of the surface is from about 1% to about 25% of the total surface of the activated carbon.

31. The composition of matter of claim 29, wherein the effective coated portion of the surface is from about 5% to about 15% of the total surface of the activated carbon.

32. The composition of matter of claim 29, wherein the effective coated portion of the surface is about 10% of the total surface of the activated carbon.

33. The composition of matter of claim 29, wherein the amount of intumescent material is from about 2% to about 20% of the weight of the activated carbon.

34. The composition of matter of claim 29, wherein the amount of intumescent material is from about 5% to about 15% of the weight of the activated carbon.

35. A composition of matter comprising:

an adsorbent comprising activated carbon; and an effective amount of an intumescent material attached to the exterior surface of the adsorbent, with a portion of the exterior surface of the adsorbent not being attached to the intumescent material, the intumescent material being operable for increasing the oxidation resistance of the adsorbent when subjected to a predetermined elevated temperature.

36. A process for increasing the oxidation resistance of activated carbon having an exterior surface comprising:

attaching to an effective portion of the exterior surface of activated carbon an intumescent material thereby forming coated activated carbon with a portion of the exterior surface of the activated carbon not being attached to the intumescent material, the effective portion of the exterior surface being large enough that, when the coated activated carbon is subjected to a predetermined elevated temperature, the intumescent material will expand and cover additional area of the exterior surface of the coated activated carbon which is sufficient for increasing the oxidation resistance of the coated activated carbon.

37. The process of claim 36, wherein the activated carbon is granular activated carbon.

38. The process of claim 36, wherein the activated carbon is pelletized activated carbon.

39. The process of claim 36, wherein the effective portion of the exterior surface is from about 3% to about 25% of the exterior surface of the activated carbon.

40. The process of claim 36, wherein the effective portion of the exterior surface is from about 5% to about 15% of the exterior surface of the activated carbon.

41. The process of claim 36, wherein said coating of a portion of the surface of granular activated carbon with an intumescent material includes:
contacting the granular activated carbon with intumescent material and water thereby forming a mixture; and
removing water from the mixture thereby forming the intumescent material coated granular activated carbon.

42. The process of claim 41, wherein the contacting is performed in a water solution.

43. The process of claim 41, wherein the contacting is performed by spraying a water solution containing the intumescent material onto the granular activated carbon.

44. A composition of matter comprising:
activated carbon having an exterior surface; and
intumescent material attached to an effective portion of the exterior surface of activated carbon thereby forming coated activated carbon with a portion of the exterior surface of the activated carbon not being attached to the intumescent material,
the effective portion of the exterior surface being large enough that, when the coated activated carbon is subjected to a predetermined elevated temperature, the intumescent material will expand and cover additional area of the exterior surface of the coated activated carbon which is sufficient for increasing the oxidation resistance of the coated activated carbon.

45. The composition of matter of claim 44, wherein the activated carbon is granular activated carbon.

46. The composition of matter of claim 44, wherein the activated carbon is pelletized activated carbon.

47. The composition of matter of claim 44, wherein the effective portion of the exterior surface is from about 3% to about 25% of the exterior surface of the activated carbon.

48. The composition of matter of claim 44, wherein the effective portion of the exterior surface is from about 5% to about 15% of the exterior surface of the activated carbon.

* * * * *